United States Patent [19]

Saurenman

[11] 4,208,438
[45] Jun. 17, 1980

[54] ION ENHANCED SMOKE TREATMENT OF EDIBLES

[75] Inventor: Donald G. Saurenman, Whittier, Calif.

[73] Assignee: Consan Pacific Incorporated, Whittier, Calif.

[21] Appl. No.: 970,863

[22] Filed: Dec. 18, 1978

Related U.S. Application Data

[62] Division of Ser. No. 893,003, Apr. 3, 1978.

[51] Int. Cl.² .............................................. A23L 3/32
[52] U.S. Cl. ...................................... 426/235; 99/473; 426/235
[58] Field of Search ................ 99/451, 473, 474, 475, 99/476; 426/235, 236

[56] References Cited

U.S. PATENT DOCUMENTS

| | | | |
|---|---|---|---|
| 2,565,454 | 8/1951 | MacKenzie et al. | 99/474 X |
| 2,585,799 | 2/1952 | Lawrence | 426/235 |
| 2,844,478 | 7/1958 | Hanley et al. | 426/235 |

OTHER PUBLICATIONS

"McGraw Hill Encyclopedia of Science & Technology", 1977, p. 274, Ion.

Primary Examiner—Arthur D. Kellogg
Attorney, Agent, or Firm—William W. Haefliger

[57] ABSTRACT

Smoke treatment of edibles such as meat is enhanced by use of electrically charged ions.

6 Claims, 3 Drawing Figures

ION ENHANCED SMOKE TREATMENT OF EDIBLES

This is a division of application Ser. No. 893,003, filed Apr. 3, 1978.

BACKGROUND OF THE INVENTION

This invention relates generally to smoke treatment of edibles, such as meat, and more particularly concerns method and apparatus to more efficiently effect such smoke treatment.

There are certain objections and disadvantages associated with conventional smoke treatment of consumables such as meat. Among these are the length of curing time required for adequate exposure of the meat to the smoke which fills the enclosure wherein the meat is supported; the cost of hardwood or other fuel required to produce such smoke; and the pollution of the outside air to which the smoke is vented. While certain proposals have been made toward alleviating these problems, none to my knowledge has provided the unusual advantages associated with the present invention, as will appear. Among these are reduced smoke exposure time; reduced smoke and fuel requirements; greatly reduced pollution; and great simplicity of use.

SUMMARY OF THE INVENTION

It is a major object of the invention to provide method and apparatus which will alleviate the described problems, as well as provide the referenced advantages. The basic method of the invention includes the steps:

(a) dispersing smoke particles in a zone wherein the edibles are located, and (b) dispersing charged ions into the smoke with the ions carrying an electrical charge causing smoke particles to be attracted to the edibles.

Since the smoke particles are attracted to the meat or edibles, less smoke and fuel are required, and less exposure time is needed.

As will be seen, negatively charged ions are typically dispersed into the smoke, and the meat typically has an initial charge more positive than that of the ions; the meat may be electrically grounded via metallic support structure in the smoke zone; the smoke and ions may be introduced into regions of the smoke zone respectively below and above the exposed meat; the ions may be dispersed into flowing streams of smoke, from multiple locations, and at alternate intervals; and the smoke may be caused to circulate as via fans.

These and other objects and advantages of the invention, as well as the details of illustrative embodiments, will be more fully understood from the following description and drawings, in which:

DRAWING DESCRIPTION

DETAILED DESCRIPTION

Figure 1:
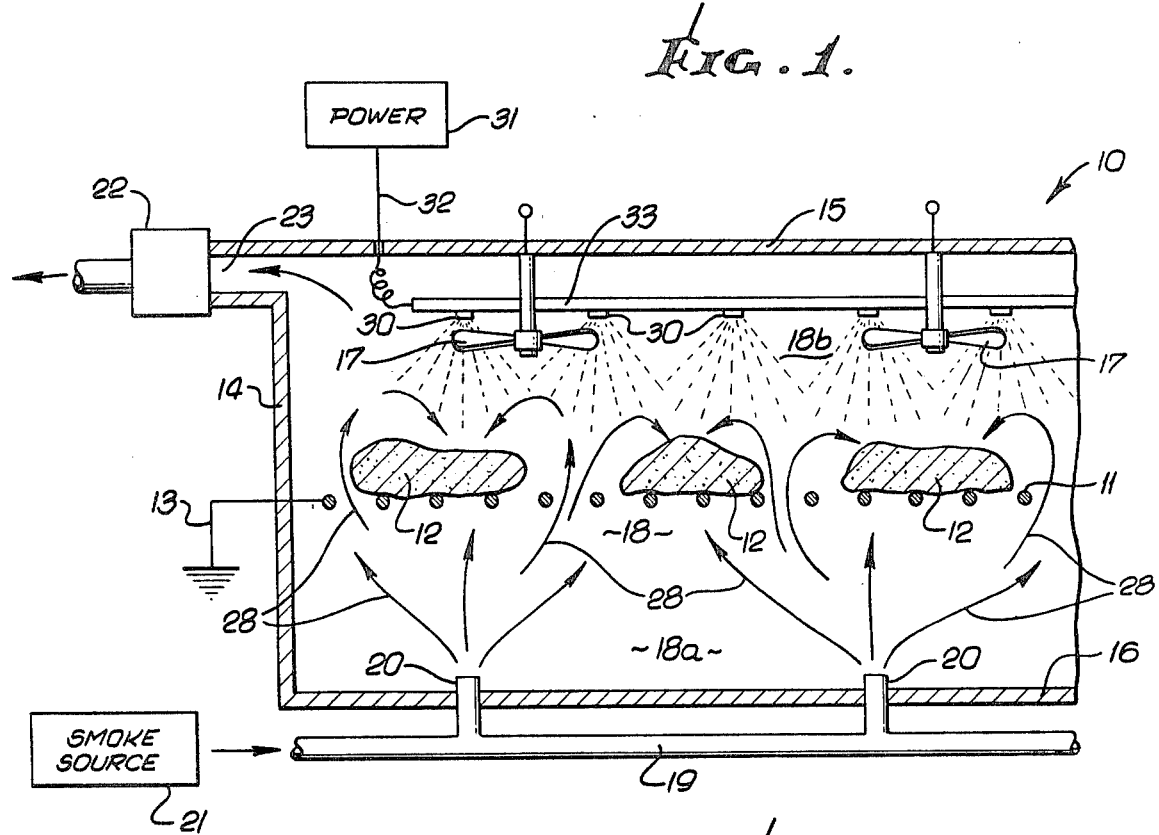
FIG. 1 is a side elevation of a smoke house interior.

In FIG. 1, a smoke house or enclosure 10 contains a support such as a metallic rack or grate 11 on which bodies of meat (or other consumables) 12 are supported. The rack may be suitably electrically grounded, as indicated at 13; alternately, the smoke house walls 14 may be grounded, and the metallic rack or grate connected to such walls. The house also typically includes a roof 15 and a floor 16, and fans 17 may be located in the interior zone 18 to cause smoke to thoroughly circulate about the meat bodies for intimate contact therewith.

Smoke may be delivered to the interior 18 as via a duct 19 with outlets 20 spaced along the floor, i.e. beneath the rack 11, so that smoke rises under and toward the meat. A suitable smoke source is indicated at 21, connected with duct 19. Outlet 23 from zone 18 serves to deliver excess smoke to the exterior via damper valve 22. In the past, such excess smoke escape was considered objectionable, as constituting a source of pollution, as well as a cost item.

In accordance with the invention, electrically charged ions are dispersed or dispensed into the smoke particles, with the ion charge causing the smoke particles to be attracted onto the consumables or edibles, such as the meat. In this regard, the ions typically carry negative charge, which is imparted to the smoke particles causing them to be attracted to the meat, the latter initially having an electrical charge or charges which is or are more positive than that of the dispersed ions. Thus, of example, the meat may be effectively grounded because of its contact with grounded grate or rack 11.

In FIG. 1, the smoke is dispersed into a lower region 18a of zone 18 below the edibles, to rise in currents 28 (as induced by fans 17) against the undersides of the meat bodies, and between the meat bodies, into the upper region 18b of zone 18 whereby the ions are dispersed. As a result, the smoke particles in zone 18b then are attracted back downwardly toward and onto the meat, whereby the meat becomes effectively smoke treated much more rapidly than in the past where ion treatment was not employed.

The means to disperse charged ions into the smoke i.e. to ionize smoke particles is shown to include ion dispensers 30 spaced generally horizontally and in upper zone 18b above the meat. Such dispensers may include multiple tips, as for example are disclosed in my U.S. Pat. No. 3,976,916 issued Aug. 24, 1976. A power source for 31 for delivering high voltage to the tips or needles may be as disclosed in U.S. Pat. No. 3,308,344. Between 10,000 and 20,000 volts DC are typically applied to the tips, as via a cable 32 that extends through conduit 33.

Inasmuch as the smoke particles are attracted to the meat or edibles, very little if any excess smoke requires venting at outlet 23, smoke pollution is effectively eliminated, and minimum smoke is required, saving expense. Also, the smoke treatment time for the edibles is minimized.

Figure 2:
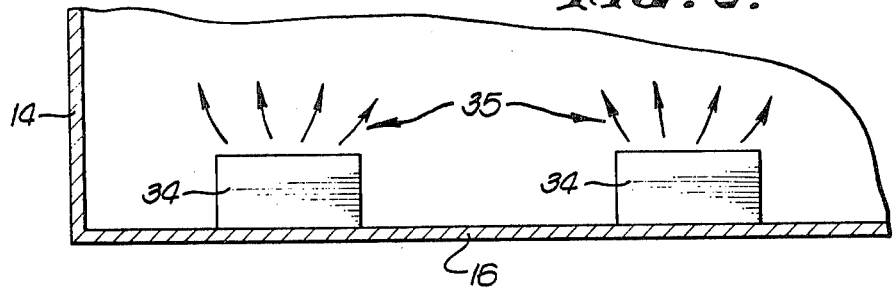
FIG. 2 is a side elevation of a modified lower portion of the FIG. 1 smoke house interior.

In FIG. 2, the smoke source is shown to comprise wood chips above burners, each burner and chip unit being indicated at 34. Rising smoke is indicated at 35.

Figure 3:
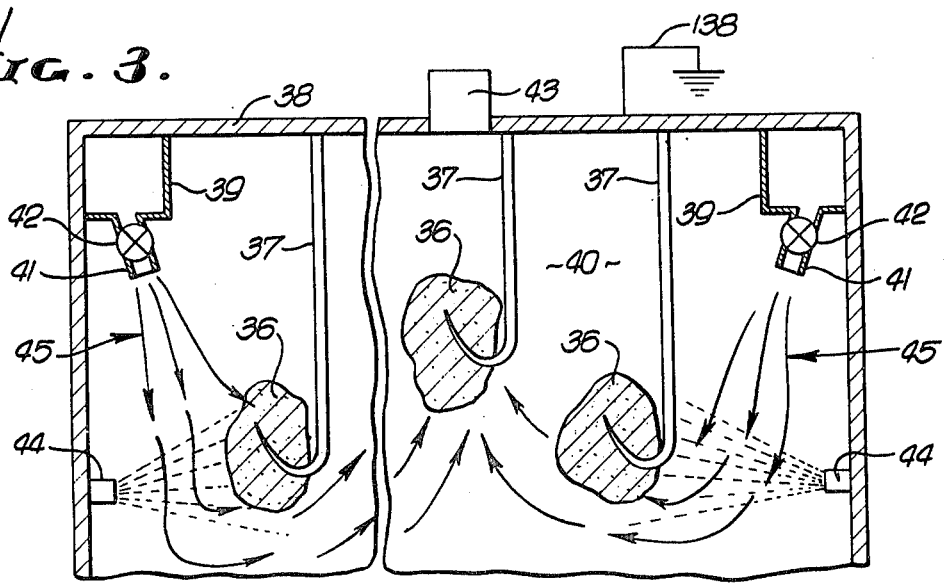
FIG. 3 is a side elevation of a further modification of a smoke house interior.

In FIG. 3, the meat 36 is suspended by metal hooks and bars, indicated generally at 37. These are suspended from the metallic ceiling 38, grounded at 138.

Smoke is delivered via flues 39 at multiple locations, as for example the opposite upper corners of the interior zone 40. The flues have outlets at 41, which are valve damper controlled as at 42. A vent appears at 43. The two dampers may, if desired, be alternately opened, to achieve smoke flow in opposite directions across the interior 40, for treatment of the meat.

The ion dispensers 44 are located lower than the flues so as to dispense ions into the smoke currents indicated as flowing downwardly and sidewardly at 45, generally toward the hook suspended meat. Accordingly, the smoke particles become negatively charged, and are attracted toward the meat.

Further in accordance with the invention, either negative or positive ions may be produced to be dispersed as described. Also, negative ions may first be dispersed to negatively charge the edibles. Then, positive ions may be dispersed to attract the smoke onto the negatively charged edibles. The reverse may also be done.

I claim:

1. In the method of enhancing smoke treatment of edibles, the steps that include
   (a) dispersing smoke particles in a zone wherein the edibles are located, said dispersing being effected primarily by smoke flow into a lower region of said zone, there being means to exhaust the smoke from an upper region of said zone, and inducing smoke particle flow to contact exposed undersides of the edibles,
   (b) applying high voltage to multiple tips exposed to the smoke flow to ionize smoke particle causing smoke particles to be attracted onto the upper sides of the edibles,
   (c) and employing metallic structure to locally contact undersides of the edibles, the said structure being at an electrical potential different from said high voltage to impart said potential to the edibles to cause the smoke particles to be attracted to the uppersides of the edibles, and while maintaining substantial extents of said undersides exposed to the smoke,
   (d) and, additionally, flowing the smoke particles from a region between said tips to which voltage is applied and said metallic structure at said potential, and in a direction and at a rate sufficient to enhance smoke particle flow onto the edibles.

2. The method of claim 1 wherein negatively charged ions are dispersed into the smoke.

3. The method of claim 2 wherein the edibles initially have an electrical charge or charges which is or are more positive than that of the ions.

4. The method of claim 3 wherein the edibles consist of meat.

5. The method of claim 4 wherein the edibles are supported by said metallic structure serving to effectively ground the edibles.

6. The method of claim 1 wherein said zone is confined and certain of said smoke is caused to flow generally downwardly and onto the edibles after the smoke has been caused to flow upwardly about the edibles.

* * * * *